United States Patent [19]
Murayama et al.

[11] 3,980,151
[45] Sept. 14, 1976

[54] FRONT WHEEL DRIVE ASSEMBLY FOR FOUR-WHEEL DRIVE TRACTOR

[75] Inventors: Yoshinobu Murayama; Kenzou Sada; Mitsuhiro Kutomi, all of Sakai, Japan

[73] Assignee: Kubota Tekko Kabushiki Kaisha, Osaka, Japan

[22] Filed: Apr. 29, 1975

[21] Appl. No.: 572,900

[30] Foreign Application Priority Data
Aug. 13, 1974 Japan.............................. 49-93132

[52] U.S. Cl............................... 180/43 A; 280/96.1
[51] Int. Cl.²................................................ B60K 17/30
[58] Field of Search............. 180/43 A, 43 R, 43 C, 180/44 R, 45, 47, 66 F; 280/96.1

[56] References Cited
UNITED STATES PATENTS

| | | | |
|---|---|---|---|
| 1,116,102 | 11/1914 | Nesmith............................ | 180/43 A |
| 1,296,216 | 3/1919 | Reif .................................. | 180/43 A |
| 1,364,398 | 1/1921 | Martin et al...................... | 180/43 A |
| 2,346,143 | 4/1944 | Asam ................................ | 180/43 A |
| 3,469,646 | 9/1969 | O'Connor.......................... | 180/43 A |

FOREIGN PATENTS OR APPLICATIONS

| | | | |
|---|---|---|---|
| 124,792 | 4/1949 | Sweden............................ | 180/43 A |

Primary Examiner—Kenneth H. Betts
Attorney, Agent, or Firm—Armstrong, Nikaido & Wegner

[57] ABSTRACT

Front wheel drive assembly comprising a tubular front wheel axle housing and rotatably supporting a differential yoke shaft having a bevel pinion at its outer end, a gear case fixedly mounted on the outer end of the front wheel axle and having a pin portion projecting from a cap of the case, an upright bevel pinion shaft housed in and rotatably supported by the gear case and having a bevel pinion meshing with the bevel pinion, the bevel pinion shaft having another bevel gear below the bevel pinion thereon, a front wheel hub shaft fixed to the disk of the front wheel and having a terminal reduction bevel gear, and a case housing the bevel gear on the hub shaft and rotatably supporting the hub shaft substantially coaxially with the yoke shaft, the bevel gear on the hub shaft meshing at its lower portion with the bevel gear on the bevel pinion shaft. The case housing the terminal reduction bevel gear is fitted over the pin portion of the gear case and around a lower portion of the bevel pinion shaft so as to hold the gear case from above and below and is turnable about a vertical axis.

1 Claim, 2 Drawing Figures

FRONT WHEEL DRIVE ASSEMBLY FOR FOUR-WHEEL DRIVE TRACTOR

BACKGROUND OF THE INVENTION

This invention relates to a drive assembly for tractors for use in agriculture and civil engineering, and more particularly to improvements in the front wheel drive assembly of four-wheel drive tractors.

For use in agriculture and civil engineering, four-wheel drive tractors are already known in which all the front and rear wheels are adapted to be driven. Four-wheel drive tractors have the advantage of giving great traction utilizing the overall weight of the tractor and possessing an increased ability to ascend an upward slope. However, since the front wheels of tractors are used for steering, the front wheel drive assembly may possibly impose restrictions on the steering function of the front wheels, failing to give a large steering angle. For agricultural uses, tractors are operated under special conditions, so that the front drive assembly involves problems. The differential unit, which is disposed at an approximate midportion between the front wheels, is positioned at a relatively low level and therefore entails difficulties when the tractor is driven over ridges and furrows. The operation on the paddy field requires a completely sealed drive assembly, but a sealed structure is difficult to provide for the front wheels which must be steerable.

These difficulties can be substantially overcome when a bevel gear system is employed as the terminal reduction gear means for the front wheel drive unit. However, if it is attempted to use a large tire as the front wheel for a front wheel axle which is positioned at low level, the vertical distance between the front wheel hub shaft and the front wheel axle becomes too large, consequently necessitating the use of a small tire for the front wheel. It would then be difficult to fully ensure the advantage of the four-wheel drive tractor. Accordingly when it is desired to use a large tire for a low wheel shaft, there arises a need to employ spur gear means to deliver the power to an upper transmission unit from which the power is transmitted to the terminal reduction gear means of the bevel gear type. This not only makes the drive assembly complex but also causes the gear housing or the like to limit the steering movement of the front wheel, reducing the steering angle of the wheel. Moreover the heavy structure requires an increased steering force and lowers the performance.

SUMMARY OF THE INVENTION

An object of this invention is to provide an assembly including terminal reduction means which is housed in the rim of the front wheel tire and which ensures the desired speed reduction to drive the front wheel even when the center of the front wheel axle is in coincidence with or is positioned close to the center of the front wheel.

Another object of this invention is to provide a front wheel drive assembly which permits the use of a large tire as the front wheel tire even when the front wheel axle is low so as to assure the usefulness of the four-wheel drive tractor.

Another object of this invention is to provide an assembly permitting the use of a large tire as the front wheel tire for a low front wheel axle without the necessity of employing spur gear or chain means conventionally used to transmit the power to an upper unit.

Still another object of this invention is to provide an assembly which is satisfactory in steering function as well as in operability on the paddy field and which is capable of driving the front wheel at the desired reduced speed.

DESCRIPTION OF THE PREFERRED EMBODIMENT

Figure 1:
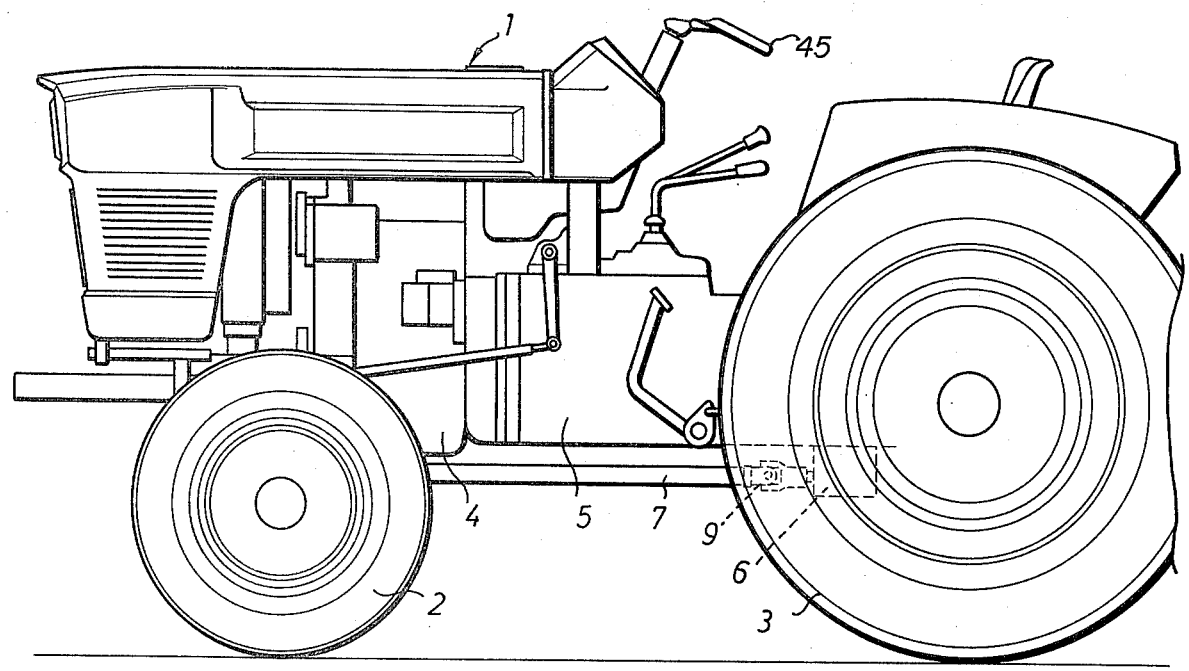
FIG. 1 is a view showing the overall appearance of a four-wheel drive tractor according to this invention.
Figure 2:
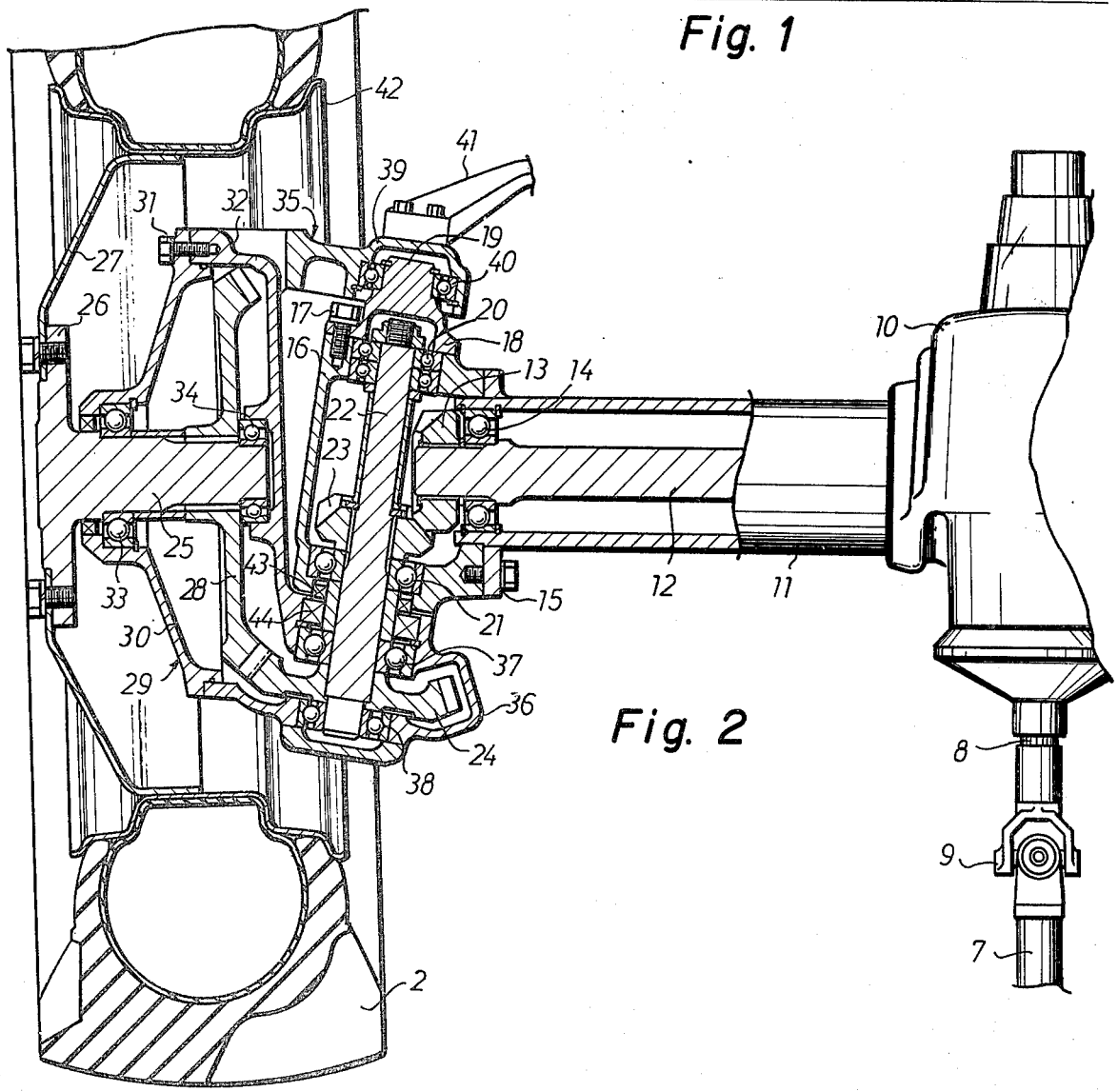
FIG. 2 is an enlarged sectional view partly in development to show the principal part of the present assembly.

FIGS. 1 and 2 show a tractor frame 1, front wheels 2, rear wheels 3, an engine 4 which is mounted on the frame 1 and positioned closer to the front, and a transmission case 5 adjacent the engine 4 and substantially consitituting part of the body of the tractor. The transmission case 5 houses for example a gear transmission assembly by which the power from the engine 4 is subjected to suitable speed reduction and is then transmitted to the rear wheels 3 by way of a rear wheel differential unit and terminal speed reduction units for the rear wheels 3. A gear case 6, detachably mounted on the bottom of the transmission case 5, accommodates gear means always or selectively meshable with gear means of a rear wheel drive power transmission unit within the transmission case 5. A propeller shaft 7, extending below and along the transmission case 5, has one end connected to the output shaft of the gear case 6 and the other end connected to a bevel pinion shaft 8 of a front wheel differential unit, each of the ends being so connected by a universal joint 9.

The front wheel differential unit is housed in a differential case 10 positioned at an approximate midportion between the pair of opposite front wheels 2. The differential case 10 is positioned substantially at the middle of the tubular front wheel axle 11. Although unillustrated, the differential case 10 is pivotably supported by the bottom of the tractor frame 1 by center pin method, so that the front wheel axle 11 is vertically pivotable. A pair of differential yoke shafts 12, 12 extend from the opposite sides of the differential case 10 through the tubular axle 11. FIG. 2 shows the differential yoke shaft 12 on the lefthand side only. Since a similar structure including the yoke shaft is symmetrically provided on the right-hand side, the left side assembly only will be described below.

As seen in FIG. 2, the differential yoke shaft 12 carries at its free end a bevel pinion 13 which is fixed thereto by spline or like means. Inside the pinion 13, the shaft 12 is rotatably supported by the front wheel axle 11 with a bearing 14 interposed therebetween. A gear case 16 is mounted on the end of the axle 11 by flange-and-bolt connecting means 15. The gear case 16 is open at its upper and lower ends. A cap 18 is secured to the upper open end by a bolt 17. A pin portion 19 projects upward from the top of the cap 18 and is concentric with the vertical axis of the upright gear case 16. An upright bevel pinion shaft 22 rotatably supported by bearings 20 and 21 is accommodated in the gear case 16. The lower end of the pinion shaft 22 extends from the lower end of the gear case 16. A bevel pinion 23 fixedly mounted by spline or like means on an intermediate portion of the pinion shaft 22 meshes with the pinion 13 on the differential yoke shaft 12. The lower projection of the pinion shaft 22 carries a bevel gear 24 fixed thereto by spline or like means. A front wheel hub shaft 25 has a flange 26 which is fixed to a front wheel disk 27 by bolts. Fixedly mounted by spine or like means on the hub shaft 25 is a terminal speed reduction bevel gear 28 which meshes, at its lower portion, with the bevel gear 24 on the pinion shaft 22. The hub shaft 25 is substantially coaxial with the front wheel axle 11.

A bowl-like case 29 for the terminal reduction unit comprises a main body 30 and a cover 32 secured to the main body 30 by bolts 31. The case 29 houses the bevel gear 28 and supports the hub shaft 25 by bearings 33 and 34 rotatably about the lateral axis of the shaft 25.

Arms 35 and 36 integral with the case cover 32 extend inward. The lower arm 36 is in the form of a substantially hollow case in which the bevel gear 24 is accommodated. The arm 36 also supports the bevel pinion shaft 22 by means of bearings 37 and 38. The upper arm 35 has a bowl-shaped portion 39 covering the pin portion 19 on the cap 18 from above. The bowl-shaped portion 39 and pin portion 19 are rendered rotatable relative to each other by a bearing 40. A knuckle arm 41 is fixed to the bowl-shaped portion 39. Thus the upper and lower arms 35, 36 are substantially in opposed relation to each other as if gripping the gear case 16 from above and below, such that the case 29 is connected to the gear case 16 rotatably about the vertical axis of the pinion shaft 22. The cases 16 and 29 are disposed in the bowl-like space in the rim 42 of the front wheel 2. Sealing members 43 and 44 for preventing admission of water are provided between the gear case 16 and the arm 36.

When the engine 4 is operated and the tractor driving clutch is engaged, the power of the engine 4 is transmitted to the transmission in the case 5 and then to the rear wheels 3 through the rear wheel differential unit and terminal speed reduction units for the rear wheels. The power also drives the gear in the front wheel driving gear case 6 which is disposed at an intermediate portion of the above-mentioned power transmission system, whereby the propeller shaft 7 is driven to transmit the power to the front wheel differential unit, then to the differential yoke shaft 12, from which the power is delivered through the pinion 13 and pinion 23 to the bevel pinion shaft 22 to drive the shaft 22 about its vertical axis. By way of the lower bevel gear 24 and the terminal reduction bevel gear 28, the power is delivered to the front wheel hub shaft 25 to rotate the front wheel 2 at a reduced speed as required.

It is noted that the arms 35 and 36 extend from the upper and lower portions of the case 29 supporting the front wheel hub shaft 25 rotatably about its lateral axis, are so positioned as to hold the gear case 16 from above and below and are turnable relative to the gear case 16 about the vertical axis of the case. Because of this construction, the operating force on a steering wheel 45 is delivered through known steering parts and members to the knuckle arm 41 fixed to the case 29 to steer the front wheel. Further because the case 29 is accommodated in the bowl-like portion of the rim 42, the present drive assembly, while assuring the desired speed reduction, permits steering through the same angle as in the the case of rear drive assembly and enables the four-wheel drive tractor to give substantially the same turning radius as the rear drive tractor.

The construction in which the terminal reduction bevel gear 28 is directly mounted on the front wheel hub shaft 25 and meshes at its lower portion with the bevel gear 24 on the bevel pinion shaft 22 makes it possible to employ a large-diameter tire as the front wheel even if the front wheel axle 11 is positioned at a low level. This enhances the benefit of the four-wheel drive tractor. Moreover, a large tire is usable as the front wheel tire without necessitating spur gear, chain or like intermediate power transmission means heretofore employed. Thus the tractor can be made correspondingly compact.

The means for preventing admission of water and mud need only be provided between the under surface of the gear case 16 and the upper surface of the lower arm 36 where they are connected together. The sealing members 43 and 44 disposed at this portion assure perfect watertightness, with the result that the tractor can be well-adapted for special working conditions for use in agriculture.

The present invention described above can of course be modified, improved or altered within the scope of this invention as defined in the appended claim.

What is claimed is:

1. A front wheel drive assembly for use in a four-wheel drive tractor comprising a front wheel axle housing rotatably supporting a differential yoke shaft having a bevel pinion at its outer end, a gear case fixedly mounted on the outer end of the front wheel axle and having a pin portion projecting from a cap of the case, an upright bevel pinion shaft housed in and rotatably supported by the gear case and having a bevel pinion meshing with the bevel pinion, the bevel pinion shaft having another bevel gear below the bevel pinion thereon, a front wheel hub shaft fixed to the disk of the front wheel and having a terminal reduction bevel gear, and a case housing the bevel gear on the hub shaft and rotatably supporting the hub shaft in a lateral position, the bevel gear on the hub shaft meshing at its lower portion with the bevel gear on the bevel pinion shaft, the second-mentioned case being fitted over the pin portion of the gear case and around a lower portion of the bevel pinion shaft so as to hold the gear case from above and below, the gear case being turnable about a vertical axis.

* * * * *

REEXAMINATION CERTIFICATE (771st)
United States Patent [19]
Murayama et al.

[11] B1 3,980,151
[45] Certificate Issued  Oct. 20, 1987

[54] FRONT WHEEL DRIVE ASSEMBLY FOR FOUR-WHEEL DRIVE TRACTOR

[75] Inventors: Yoshinobu Murayama; Kenzou Sada; Mitsuhiro Kutomi, all of Sakai, Japan

[73] Assignee: Kubota Tekko Kabushiki Kaisha, Osaka, Japan

Reexamination Request:
No. 90/001,134, Dec. 3, 1986

Reexamination Certificate for:
Patent No.: 3,980,151
Issued: Sep. 14, 1976
Appl. No.: 572,900
Filed: Apr. 29, 1975

[30] Foreign Application Priority Data
Aug. 13, 1974 [JP] Japan ................... 49-93132

[51] Int. Cl.⁴ ............................................. B60K 17/30
[52] U.S. Cl. .................... 180/261; 180/233; 280/96.1
[58] Field of Search ............ 180/261, 262, 233, 252, 180/253, 905, 255; 74/386, 417, 424

[56] References Cited
U.S. PATENT DOCUMENTS

| | | | |
|---|---|---|---|
| 1,124,533 | 1/1915 | Sandstrom | 180/262 |
| 1,296,216 | 3/1919 | Reif | 180/262 |
| 1,303,285 | 5/1919 | Freeman | 180/261 |
| 1,364,398 | 1/1921 | Martin et al. | 180/261 |
| 2,281,451 | 4/1942 | North | 74/386 |
| 2,306,958 | 12/1942 | Kurti | 74/386 |
| 2,346,143 | 4/1944 | Asam | 180/262 |
| 2,595,494 | 5/1952 | Stratman | 180/262 |
| 3,469,646 | 9/1969 | O'Connor | 180/255 |

*Primary Examiner*—John J. Love

[57] ABSTRACT

Front wheel drive assembly comprising a tubular front wheel axle housing and rotatably supporting a differential yoke shaft having a bevel pinion at its outer end, a gear case fixedly mounted on the outer end of the front wheel axle and having a pin portion projecting from a cap of the case, an upright bevel pinion shaft housed in and rotatably supported by the gear case and having a bevel pinion meshing with the bevel pinion, the bevel pinion shaft having another bevel gear below the bevel pinion thereon, a front wheel hub shaft fixed to the disk of the front wheel and having a terminal reduction bevel gear, and a case housing the bevel gear on the hub shaft and rotatably supporting the hub shaft substantially coaxially with the yoke shaft, the bevel gear on the hub shaft meshing at its lower portion with the bevel gear on the bevel pinion shaft. The case housing the terminal reduction bevel gear is fitted over the pin portion of the gear case and around a lower portion of the bevel pinion shaft so as to hold the gear case from above and below and is turnable about a vertical axis.

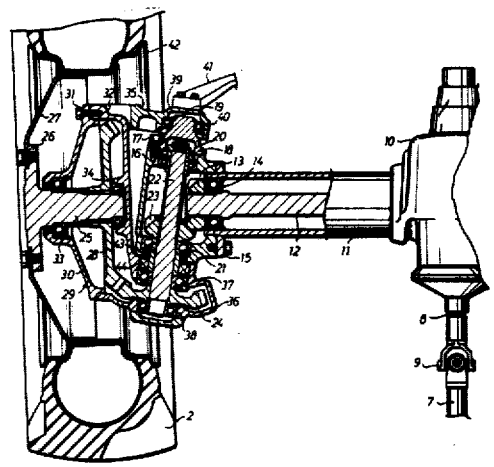

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

1. A front wheel drive assembly for use in a four-wheel drive tractor comprising a front wheel axle housing *(11)* rotatably supporting a differential yoke shaft *(12)* having a *first* bevel pinion *(13)* at its outer end, a *first* gear case *(16)* fixedly mounted on the outer end of the front wheel axle *housing* and having a pin portion *(19)* projecting from a cap of the case, an upright bevel pinion shaft *(22)* housed in and rotatably supported by the *first* case *(16)* and having a *second* bevel pinion *(23)* meshing with the *first* bevel pinion *13*, the bevel pinion shaft *(22)* having [another] *a first* bevel gear *(24)* below the *second* bevel pinion *(23)* thereon, *a second gear case, said second gear case including a main body having a central aperture therein and a cover having an upper, intermediate and bottom portion, said second gear case supporting* a front wheel hub shaft *(25)* fixed *at an outer end thereof* to [the] *a* disk of the front wheel and [having] a terminal reduction *second* bevel gear *(28)* secured on its inner end, [and a] *said main body of said second gear* case *(29)* [housing the bevel gear on the hub shaft and] *rotatably supporting said hub shaft near its outer end in said aperture and together with said cover (32) rotatably supporting* [the] *said* hub shaft in a lateral position, the *second* bevel gear *(28)* on the hub shaft meshing at its lower portion with the bevel gear *(24)* on the bevel pinion shaft *(22)*, [the second-mentioned case being] *said upper portion of said cover being* fitted over the pin portion *(19)* of the *first* gear case [and around] *with said intermediate portion fitting around and supported by a first bearing on* a lower portion of [the] *said* bevel pinion shaft *with said bottom portion of said cover fitting around and supported by a second bearing on an end portion of said bevel pinion shaft (22)* so as to [hold] *support* the *second* gear case from above and below, the *second* gear case being turnable about a vertical axis *defined by said bevel pinion shaft.*

* * * * *